United States Patent [19]

Brantley et al.

[11] Patent Number: 4,861,687

[45] Date of Patent: Aug. 29, 1989

[54] BATTERY HANDLE ADAPTER

[75] Inventors: Randall F. Brantley, Sylvester, Ga.; Harry D. McVey, Pendleton, Ind.

[73] Assignee: General Motors Corporation, Detroit, Mich.

[21] Appl. No.: 226,708

[22] Filed: Aug. 1, 1988

[51] Int. Cl.[4] ..................... H01M 2/10; B65D 25/28
[52] U.S. Cl. ............................... 429/187; 16/114 R; 16/DIG. 15; 220/94 R; 294/903
[58] Field of Search ............... 424/187; 16/DIG. 15, 16/114 R; 74/551.8, 551.9; 220/94 R; 294/903

[56] References Cited

U.S. PATENT DOCUMENTS

| | | | |
|---|---|---|---|
| 1,540,155 | 6/1925 | Wydom et al. | 429/187 X |
| 1,679,657 | 8/1928 | Glancy | 16/DIG. 15 X |
| 3,092,520 | 6/1963 | Buskirk et al. | 429/187 |
| 4,029,248 | 6/1977 | Lee | 429/187 X |
| 4,673,625 | 6/1987 | McCartney et al. | 429/187 |

*Primary Examiner*—Stephen J. Kalafut
*Attorney, Agent, or Firm*—Lawrence B. Plant

[57] ABSTRACT

Adapter for mounting a handle to a battery having finger-hole recesses on opposite ends thereof. The adapter comprises a comb-like insert including a plurality of fingers closely received within the recess.

6 Claims, 3 Drawing Sheets

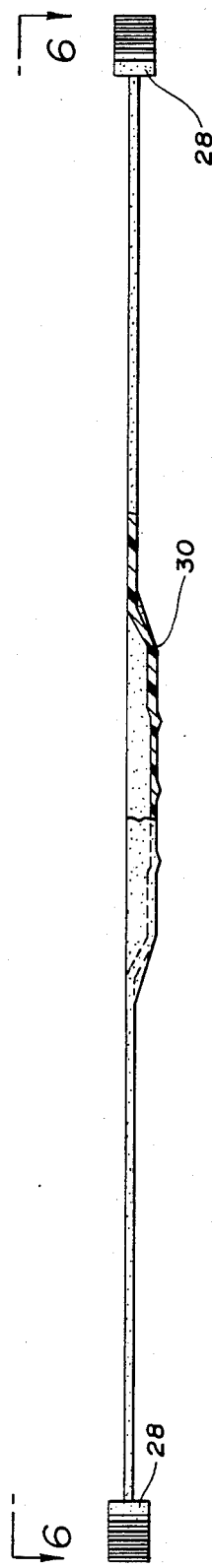
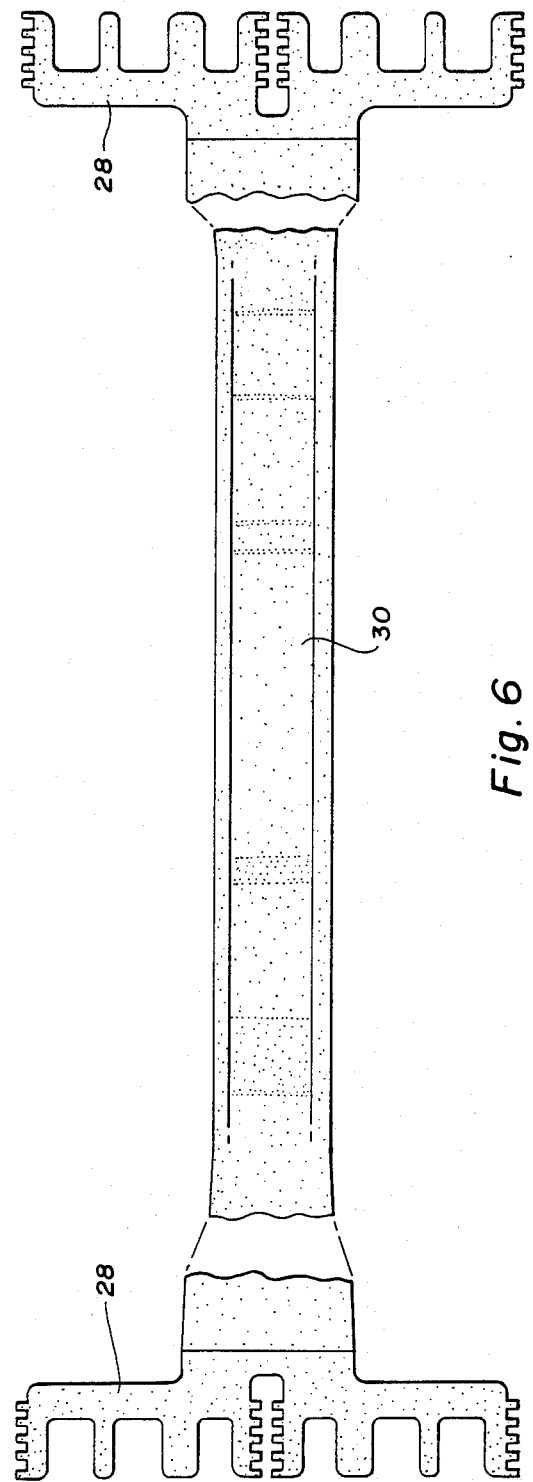
Fig. 5
Fig. 6

BATTERY HANDLE ADAPTER

This invention relates to carrying handles for electric-storage batteries and more particularly to an adapter for connecting a battery handle to elongated finger-hole recesses formed in a battery container.

BACKGROUND OF THE INVENTION

It is well known to provide batteries with detachable carrying handles. It is likewise well known to provide batteries with elongated recesses on the opposite ends thereof to serve as finger-holes for lifting/carrying the battery.

It is the object of the present invention to provide an adapter for detachably mounting a carrying handle to a battery having finger-hole recesses therein.

BRIEF DESCRIPTION OF THE INVENTION

The present invention comprehends an adapter for detachably mounting a carrying handle to a battery having elongated finger-hole recesses at each end thereof for lifting/carrying the battery. The adapter comprises a comb-like insert adapted to be closely received within the recess and includes an elongated spine having a plurality of fingers projecting from one longitudinal side thereof for binding engagement therein when lifting forces are applied thereto by the handle. The weight of the battery acting on the ends of the handle engaging the insert causes the insert to become wedged within the recess. The adapter will preferably be integral with the handle and include a plurality of flexible ribs on the end-most fingers for providing an interference fit between the adapter and the recess. Alternatively, the adapter may be a separate piece which itself is adapted to engage a separate handle detachable therefrom and accordingly includes a means (e.g., knob) projecting from the spine in a direction opposite to the fingers and outboard the end walls of the battery container for engaging the battery handle.

DETAILED DESCRIPTION OF SPECIFIC EMBODIMENTS OF THE INVENTION

The invention will better be understood when considered in the light of the following detailed description of specific embodiments thereof which is given thereafter in conjunction with the several drawings in which:

FIG. 5 is a partially broken away elevational view of a battery handle and integral adapter in accordance with the preferred embodiment of the present invention; and FIG. 6 is a plan view in the direction 6—6 of FIG. 5.

Figure 1:
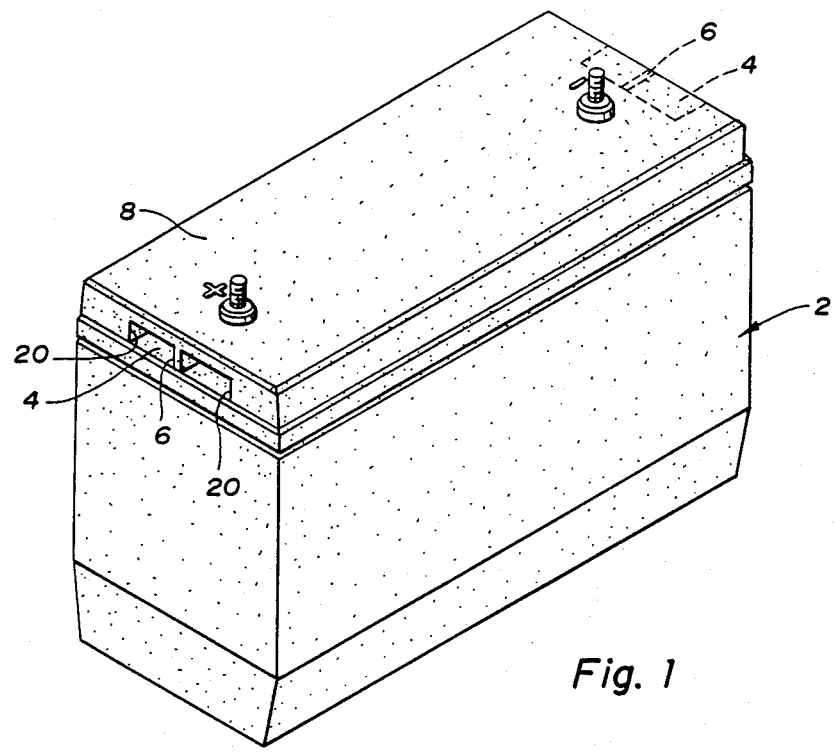
FIG. 1 is an isometric view of a battery of the type benefiting from the present invention.

FIG. 1 shows a battery 2 having elongated fingerhole recesses 4 in opposite ends thereof for lifting/carrying the battery 2. Preferably, a vertical septum 6 divides the recess 4 in two parts and serves to strengthen the region of the cover 8 overlying the recess 4.

Figure 2:
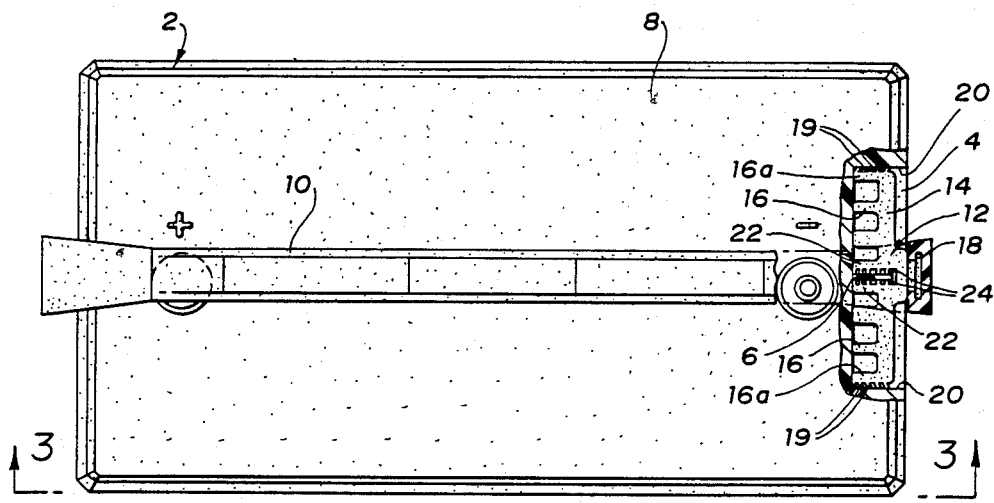
FIG. 2 is a partially broken away plan view of the battery of FIG. 1 with a separate detachable carrying handle in place thereover.
Figure 3:
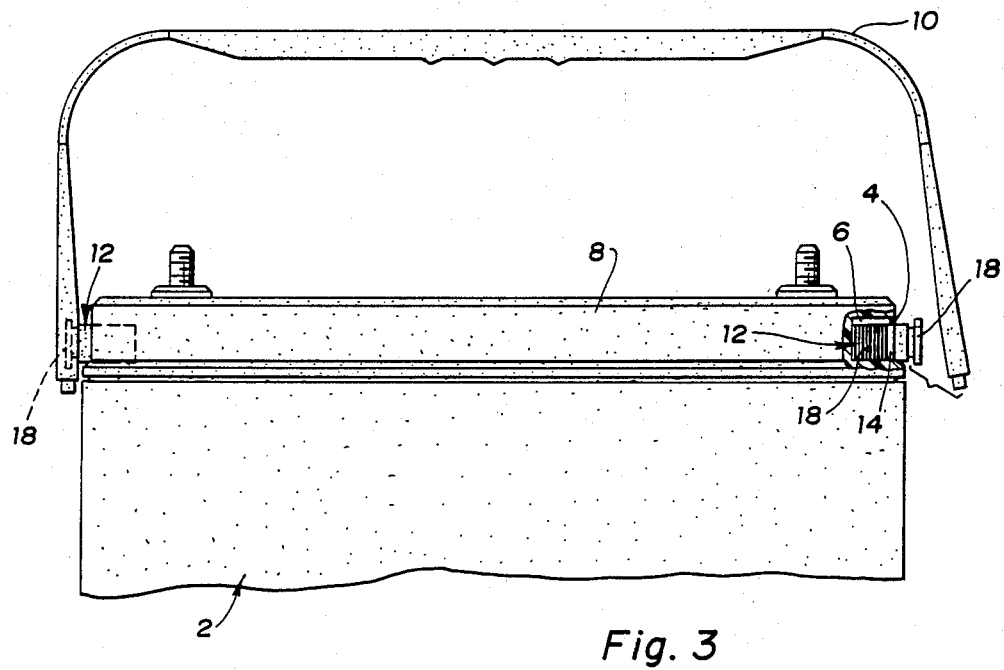
FIG. 3 is a partially broken away view in the direction 3—3 of FIG. 2 with the right end of the handle detached from the battery.
Figure 4:
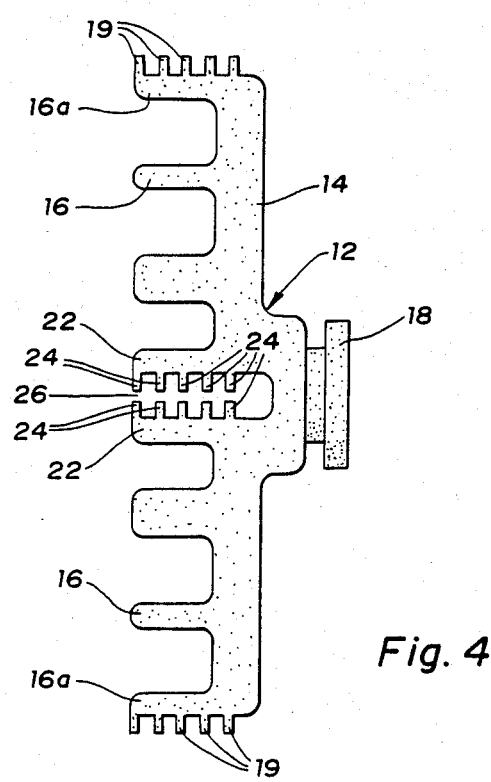
FIG. 4 is a plan view of a discrete adapter in accordance with the present invention.

As best shown in FIGS. 2-4, a handle 10 such as described in U.S. Pat. No. 4,673,625 issued June 16, 1987 is fitted to the battery 2 by means of an adapter insert 12 sufficiently closely fitted into the recess 4 as to become wedged or bound up tightly within the recess 4 when lifting forces are transmitted by the handle 10 thereto. The adapter 12 (best shown in FIG. 4) is sized to fit within the recess 4 in an interference fit and comprises an elongated spine 14 portion having a plurality of fingers 16 projecting from one of its longitudinal sides. A knob 18 projects from another side of the spine 14 in a direction opposite that of the fingers 16 and serves as a means to engage a separate detachable handle 10. The fingers 16a at the extreme ends of the spine 14 include flexible ribs 19 projecting outwardly therefrom which deflect upon engagement with the end walls 20 of the recess 4 so as to provide a tight fit between the adapter 12 and the spine 14.

In those situations where the recess 4 includes a central septum 6, the centermost pair of fingers 22 include inwardly projecting flexible ribs 24 which deflect and grip the septum 6 therebetween as best shown in FIG. 2. In this regard, the opening 26 between the distal ends of the opposing ribs 24 will be slightly less than the thickness of the septum 6 so as to insure a firm gripping action of the septum 6 by the ribs 24.

In the embodiment shown in FIGS. 2-4, the adapter 12 is a separate/discrete part adapted to mate with a separable/detachable handle 10. In the embodiment shown in FIGS. 5 and 6, however, the adapter 28 is formed integrally with the ends of the handle 30 but is otherwise identical to, and functions the same as, the adapter/insert heretofore described in conjunction with FIGS. 2-4.

While the invention has been disclosed primarily in terms of certain specific embodiments thereof it is not intended to be limited thereto but rather only to the extent set forth hereafter in the claims which follow.

The embodiments of the invention in which an exclusive property or privilege is claimed are defined as follows:

1. A detachable adapter for mounting a carrying handle to a battery having an elongated preformed fingerhole recessed in opposite ends thereof and extending substantially parallel to the top of the battery, said adapter comprising a comb-like insert adapted to be inserted into and closely received within a said fingerhole and comprising an elongated spine conforming substantially to the length of said fingerhole and a plurality of fingers projecting in substantially the same direction substantially normal to a longitudinal side of said spine for close fitting within said fingerhole and binding engagement therein when lifting forces are applied to said insert by said handle.

2. An adapter according to claim 1 wherein said handle is integral with said insert.

3. An adapter according to claim 1 including means for engaging a detachable handle.

4. An adapter according to claim 1 wherein the fingers on the ends of said spine each include at least one flexible rib on the outside face thereof for engaging the ends of said recess in an interference fit.

5. An adapter according to claim 4 wherein said recess includes a septum dividing said recess into at least two parts, and said insert includes a pair of adjacent said fingers inboard said end fingers, said inboard fingers each having at least one flexible rib projecting toward a similar flexible rib on the other inboard finger of said pair and together therewith forming a narrow gap therebetween for receiving said septum, said gap being slightly narrower than the thickness of said septum such that said septum is received therein in an interference fit.

6. An adapter according to claim 5 wherein said handle is integral with said spine.

* * * * *